United States Patent
Cha et al.

(10) Patent No.: US 8,197,983 B2
(45) Date of Patent: Jun. 12, 2012

(54) METHOD OF MANUFACTURING A FUEL CELL BY ELECTRICALLY CONNECTING A FIRST CELL AND A SECOND CELL COUPLED OVER BOTH SIDES OF A MEMBRANE WITH A PREDETERMINED GAP BETWEEN THE FIRST CELL AND THE SECOND CELL

(75) Inventors: Hye-Yeon Cha, Seongnam-si (KR); Young-Soo Oh, Seongnam-si (KR); Jae-Hyuk Jang, Seongnam-si (KR); Sung-Han Kim, Suwon-si (KR); Miesse Craig, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 1103 days.

(21) Appl. No.: 12/078,736

(22) Filed: Apr. 3, 2008

(65) Prior Publication Data
US 2008/0261088 A1    Oct. 23, 2008

(30) Foreign Application Priority Data
Apr. 10, 2007   (KR) .................. 10-2007-0034915

(51) Int. Cl.
*H01M 2/20*     (2006.01)
*H01M 2/26*     (2006.01)
(52) U.S. Cl. ................ 429/507; 429/508; 29/623.1
(58) Field of Classification Search ............ None
See application file for complete search history.

(56) References Cited

U.S. PATENT DOCUMENTS

| | | | | |
|---|---|---|---|---|
| 2004/0086762 A1* | 5/2004 | Maeda et al. | .............. | 429/32 |
| 2004/0121215 A1* | 6/2004 | Fujii et al. | .............. | 429/35 |
| 2008/0050632 A1* | 2/2008 | Salter et al. | .............. | 429/30 |

FOREIGN PATENT DOCUMENTS

| | | |
|---|---|---|
| JP | 2004-158335 | 6/2004 |
| JP | 2006-86045 | 3/2006 |
| KR | 10-2004-0074111 | 8/2004 |
| KR | 10-2005-0085689 | 8/2005 |

OTHER PUBLICATIONS

Korean Patent Office Action, mailed Feb. 21, 2008 and issued in corresponding Korean Patent Application No. 10-2007-0034915.
Japanese Office Action issued Sep. 6, 2011 in corresponding Japanese Patent Application 2008-081179.

* cited by examiner

*Primary Examiner* — Barbara Gilliam
*Assistant Examiner* — Kwang Han

(57) ABSTRACT

A fuel cell and a method of manufacturing the fuel cell are disclosed. A method of manufacturing a fuel cell by electrically connecting a first cell and a second cell that are coupled over both sides of a membrane with a predetermined gap between the first cell and the second cell, where the first cell and the second cell each has an anode on one side and a cathode on the other side, may include perforating a hole in the membrane between the first cell and the second cell, and electrically connecting the anode of the first cell with the cathode of the second cell through the hole using a conductive member. This method does not entail unnecessary increases in volume or complicated flow paths, and the method can reduce electrical resistance while simplifying the peripheral equipment.

5 Claims, 11 Drawing Sheets

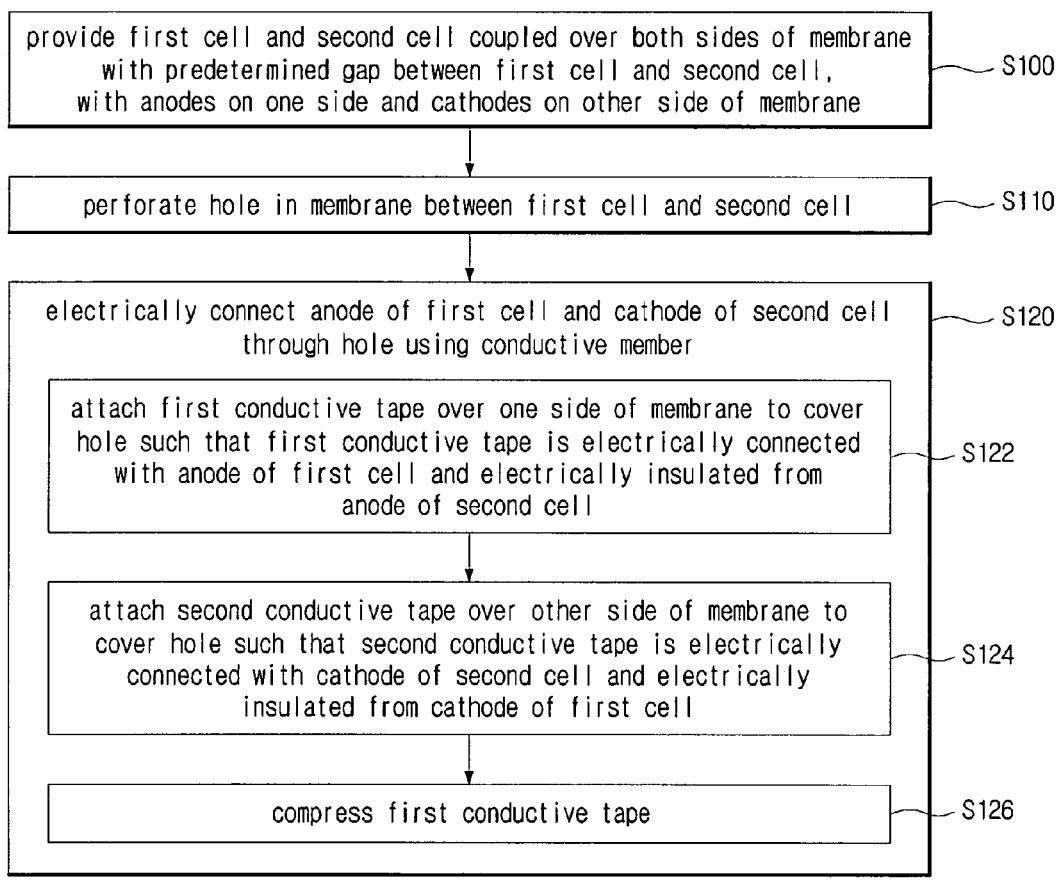

METHOD OF MANUFACTURING A FUEL CELL BY ELECTRICALLY CONNECTING A FIRST CELL AND A SECOND CELL COUPLED OVER BOTH SIDES OF A MEMBRANE WITH A PREDETERMINED GAP BETWEEN THE FIRST CELL AND THE SECOND CELL

CROSS-REFERENCE TO RELATED APPLICATIONS

This application claims the benefit of Korean Patent Application No. 10-2007-0034915 filed with the Korean Intellectual Property Office on Apr. 10, 2007, the disclosure of which is incorporated herein by reference in its entirety.

BACKGROUND

1. Technical Field

The present invention relates to a fuel cell and to a method of manufacturing the fuel cell.

2. Description of the Related Art

In a fuel cell, the output voltage that can be provided by an individual cell may be a fixed value, determined by the electrochemical reactions. As such, in order to supply the operating power required by an electronic product, it may be necessary to use a DC-DC converter or serially connect the individual cells to increase the output voltage.

According to the method of arranging the individual cells for connection, a fuel cell can be divided into a bipolar stack or a monopolar stack.

FIG. 1 is a cross-sectional view of a fuel cell according to the related art, in which a bipolar stack structure is shown. In the case of medium- or large-sized fuel cells, most of the fuel cells take the form of a bipolar stack. As illustrated in the drawing, cells which include anodes 2, 3 and cathodes 2, 4 formed in contact with a membrane 1, and separation plates may be stacked alternately in layers.

The bipolar stack structure may entail a large volume for the fuel cell, and are thus applied more often in medium- to large-sized fuel cells. Since the power supply used in portable electronic equipment may desirably be given a thin shape, it can be problematic to employ a fuel cell of a bipolar stack structure for such a power supply, due to the large thickness involved. As such, there can be problems in implementing a compact size and in providing a high output.

To overcome these problems of the bipolar stack structure, a fuel cell can be implemented to have a monopolar stack structure. The fuel cell of a monopolar stack structure can provide a higher output density per volume, and enables the supply of fuel without external power, so that the form of the fuel cell may be varied relatively freely. As such, the monopolar stack structure is often employed in small-sized fuel cells.

The monopolar stack structure can in turn be divided into a banded structure or a flip-flop structure.

The banded structure may require a connection crossing the membrane, while the flip-flop structure may be of a simple shape, having only a single-layer connection.

While the banded structure may simplify the method of supplying fuel and air, the banded structure may require additional complicated equipment for connecting the electrodes in serial.

With the flip-flop structure, it is possible to naturally form a serially connected stack by having adjacent unit cells share a common electrode. However, the fuel cell thus formed may entail an extremely complicated flow path for supplying the fuel and air.

SUMMARY

An aspect of the invention provides a fuel cell and a method of manufacturing the fuel cell, which provide a high output voltage without unnecessary increases in volume or complicated flow paths, and which does not require additional equipment.

Another aspect of the invention provides a method of manufacturing a fuel cell by electrically connecting a first cell and a second cell that are coupled over both sides of a membrane with a predetermined gap between the first cell and the second cell, where the first cell and the second cell each has an anode on one side and a cathode on the other side. This method includes perforating a hole in the membrane between the first cell and the second cell, and electrically connecting the anode of the first cell with the cathode of the second cell through the hole using a conductive member.

The first cell may include a catalyst layer stacked on the membrane, where the anode and the cathode can be made from the catalyst layer.

The first cell may further include a gas diffusion layer, and the anode and the cathode can be made from the gas diffusion layer.

The gas diffusion layer can include at least one selected from a group consisting of carbon paper, carbon cloth, and carbon felt. The hole can be formed by laser drilling.

The operation of electrically connecting the anode of the first cell with the cathode of the second cell through the hole by way of a conductive member can include attaching a first conductive tape onto one side of the membrane, such that the first conductive tape is electrically connected to the anode of the first cell and covers the hole, and attaching a second conductive tape onto the other side of the membrane, such that the second conductive tape is electrically connected to the cathode of the second cell and covers the hole.

In certain embodiments, the method may further include, after attaching the second conductive tape, electrically connecting the first conductive tape and the second conductive tape by compressing the first conductive tape and the second conductive tape.

The first conductive tape may contain at least one selected from a group consisting of platinum, copper, and aluminum.

Also, attaching the first conductive tape can include attaching the first conductive tape such that the first conductive tape is electrically insulated from the anode of the second cell.

Yet another aspect of the invention provides a fuel cell which includes a hole perforated in a membrane between a first cell and a second cell, each of which has an anode on one side of the membrane and a cathode on the other side of the membrane; and a conductive member that electrically connects the anode of the first cell and the cathode of the second cell through the hole.

The conductive member can include a first conductive tape, which may be electrically connected to the anode of the first cell and attached to one side of the membrane, and a second conductive tape, which may be electrically connected to the cathode of the second cell and attached to the other side of the membrane, where the second conductive tape may be electrically connected with the first conductive tape through the hole.

The first conductive tape may contain at least one selected from a group consisting of platinum, copper, and aluminum.

The first cell can include a catalyst layer stacked on the membrane, and the anode and the cathode can be made from the catalyst layer.

The first cell can further include a gas diffusion layer, and the anode and the cathode can be made from the gas diffusion layer.

The gas diffusion layer may include at least one selected from a group consisting of carbon paper, carbon cloth, and carbon felt.

Additional aspects and advantages of the present invention will be set forth in part in the description which follows, and in part will be obvious from the description, or may be learned by practice of the invention.

BRIEF DESCRIPTION OF THE DRAWINGS

FIG. 2 is a flowchart for a method of manufacturing a fuel cell according to an embodiment of the present invention.

DETAILED DESCRIPTION

Figure 1:
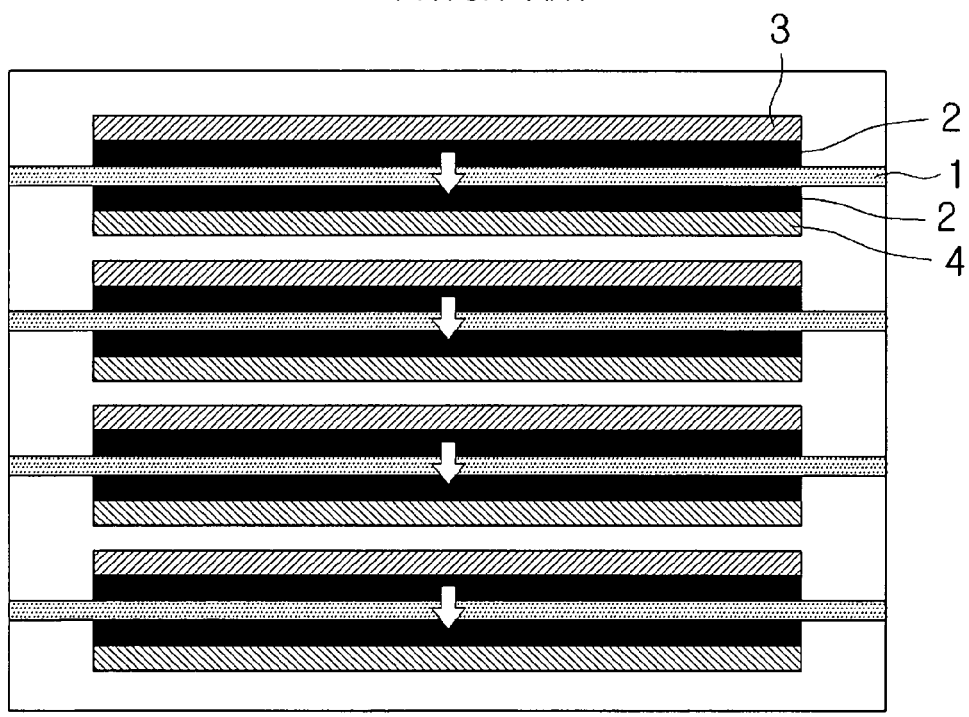
FIG. 1 is a cross-sectional view of a fuel cell according to the related art.

The fuel cell and method of manufacturing the fuel cell according to certain embodiments of the invention will be described below in more detail with reference to the accompanying drawings. Those components that are the same or are in correspondence are rendered the same reference numeral regardless of the figure number, and redundant explanations are omitted.

FIG. 2 is a flowchart for a method of manufacturing a fuel cell according to an embodiment of the present invention, while FIGS. 3A to 3D are cross-sectional views representing a flow diagram for a method of manufacturing a fuel cell according to an embodiment of the present invention. In FIGS. 3A to 3D, there are illustrated a membrane 10, a first cell 20, a second cell 30, anodes 20a, cathodes 20b, catalyst layers 21a, 21b, gas diffusion layers 22a, 22b, holes 40, first conductive tape 50a, second conductive tape 50b, and compressed conductive tape 50.

One embodiment of this invention provides a method of manufacturing a fuel cell, in which the electrical connection between multiple cells that are to be connected serially may be obtained by way of conductive tape, which may be attached over and compressed through holes formed between the multiple cells. In this way, the fuel cell can be implemented without unnecessary increases in volume and without complicated flow paths.

Figure 3A:
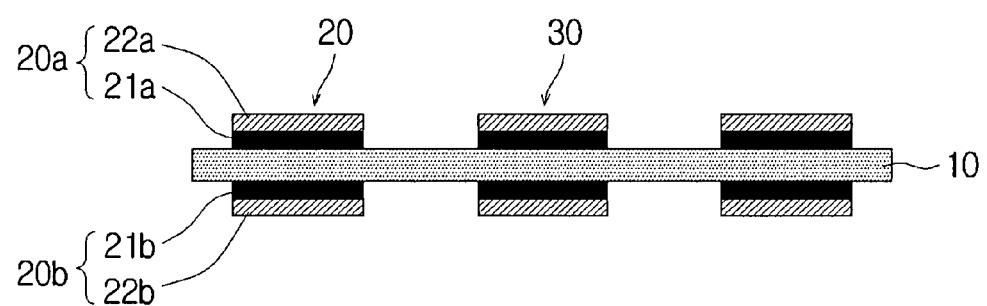
FIG. 3A, FIG. 3B, FIG. 3C, and FIG. 3D are cross-sectional views representing a flow diagram for a method of manufacturing a fuel cell according to an embodiment of the present invention.

To manufacture a fuel cell according to this embodiment, a first cell 20 and a second cell 30 may first be prepared, which may be coupled over both sides of a membrane 10 with a particular gap between the first and second cells 20, 30, with anodes 20a formed on one side and cathodes 20b formed on the other (S100). As illustrated in FIG. 3A, the first cell 20 and the second cell 30 can each include catalyst layers 21a, 21b stacked over the membrane 10 and gas diffusion layers 22a, 22b stacked over the catalyst layers 21a, 21b, and the anodes 20a and cathodes 20b can be made from the catalyst layers 21a, 21b and gas diffusion layers 22a, 22b.

The catalyst layers 21a, 21b may serve to transform fuel into electrons and hydrogen, by way of the oxidation reaction of the fuel cell, while the gas diffusion layers 22a, 22b may serve to facilitate the movement of the electrons and hydrogen ions after the oxidation reaction.

A gas diffusion layer 22a, 22b can include at least one of carbon paper, carbon cloth, and carbon felt.

Figure 3B:
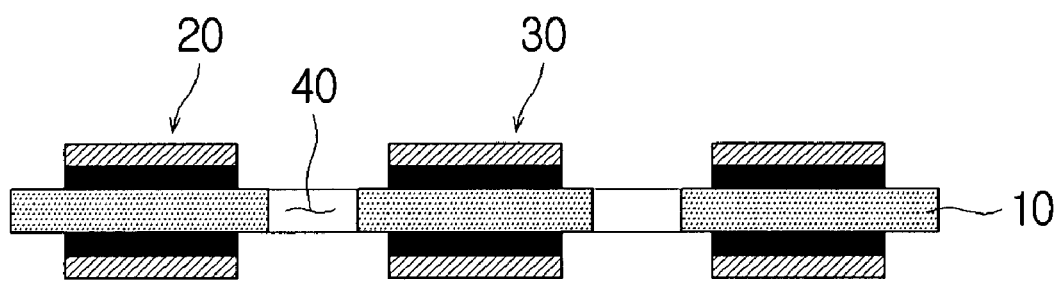

Next, a hole 40 may be perforated in the membrane 10 between the first cell 20 and the second cell 30 (S110). The hole 40 can be formed by laser drilling, for example. An example of an arrangement with holes formed is as illustrated in FIG. 3B.

Afterwards, the anode 20a of the first cell 20 and the cathode 20b of the second cell 30 may be electrically connected through the hole 40 using a conductive member (S120). While this particular embodiment describes conductive tape as an example of a conductive member, it is apparent that other types of conductive member can be used which may reduce resistance in the fuel cell and which may not require high temperatures, unlike the curing processes performed after plating or printing paste.

Figure 3C:
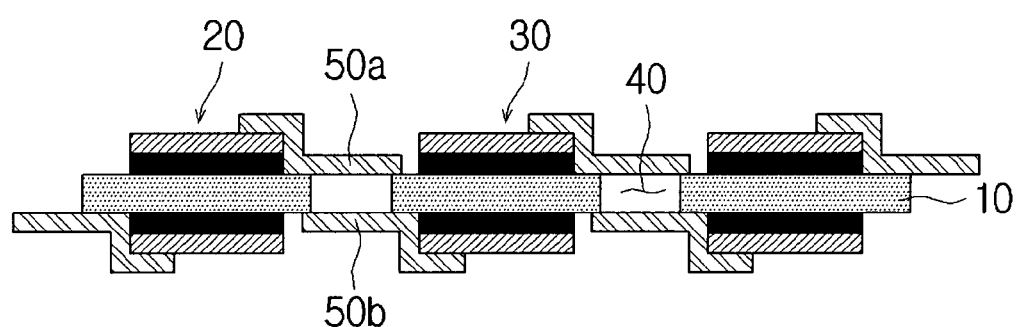

The connecting method may proceed as illustrated in FIG. 3C, in which a first conductive tape 50a may be attached over one side of the membrane 10 to cover the hole 40, such that the first conductive tape 50a may be electrically connected with the anode 20a of the first cell 20 but electrically insulated from the anode 20a of the second cell 30 (S122).

Also, a second conductive tape 50b may be attached over the other side of the membrane 10 to cover the hole 40, such that the second conductive tape 50b may be electrically connected with the cathode 20b of the second cell 30 but electrically insulated from the cathode 20b of the first cell 20 (S124).

The first conductive tape 50a and second conductive tape 50b can include at least one of platinum, copper, and aluminum.

Figure 3D:
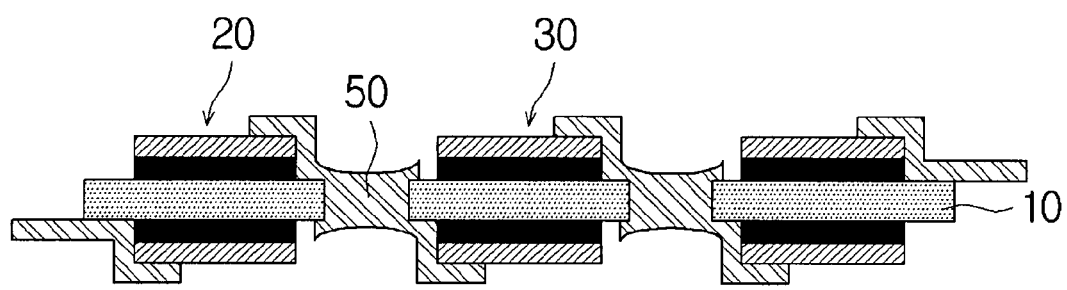

Lastly, as illustrated in FIG. 3D, the first conductive tape 50a and the second conductive tape 50b may be compressed together, such that the first conductive tape 50a and the second conductive tape 50b may be electrically connected to each other (S126). In this way, the anode 20a of the first cell 20 and the cathode 20b of the second cell 30 can be electrically connected, the supply flow paths for fuel and air can be simplified, and there is no need for electrical bridges around the membrane 10.

By attaching and compressing the conductive tape 50a, 50b between the first cell 20 and second cell 30, it is possible to implement electrical connections for a flat type fuel cell. At the same time, unnecessary increases in volume can be avoided, and complicated flow paths for electrical connections between cells need not be implemented.

In connecting the anode and cathode on either side of a membrane by forming holes in the membrane of a flat type fuel cell, the electrical connections can be implemented using electrically conductive material formed within the holes. In electrically connecting the electrodes in a conventional fuel cell, a conductive paste is used that requires high-temperature curing, so that the manufacture of the fuel cell may result in problems in the membrane.

The conductive tape 50a, 50b of this embodiment can prevent the problem of the fuel leaking across the membrane 10, and since the attaching of the conductive tape 50a, 50b does not require a high temperature, there may be no damage to the membrane 10.

As the anode 20a and cathode 20b can be attached in a simple manner by way of the conductive tape 50a, 50b, there is no need for complicated peripheral equipment to connect the electrodes in serial. Also, by compressing the first conductive tape 50a and second conductive tape 50b attached over one side and the other of the hole 40 to fill in the hole 40, the electrical resistance between electrodes can be reduced.

Furthermore, multiple cells can be formed in serial within the fuel cell, which can be implemented as a flat plate, so that the output voltage can be increased, without requiring a DC-DC converter to provide the necessary operating power.

FIGS. 4A to 4D are cross-sectional views representing a flow diagram for a method of manufacturing a fuel cell according to another embodiment of the present invention. In FIGS. 4A to 4D, there are illustrated a membrane 100, a first cell 200, a second cell 300, anodes 210a, cathodes 210b, holes 400, first conductive tape 500a, second conductive tape 500b, and compressed conductive tape 500.

Figure 4A:
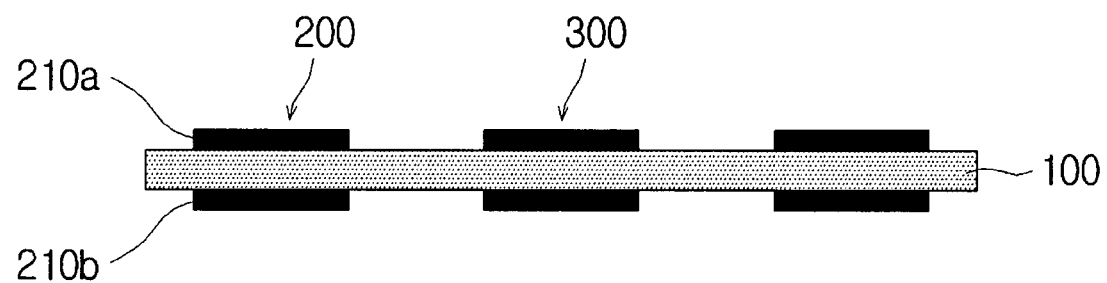
FIG. 4A, FIG. 4B, FIG. 4C, and FIG. 4D are cross-sectional views representing a flow diagram for a method of manufacturing a fuel cell according to another embodiment of the present invention.

As illustrated in FIG. 4A, a first cell 200 and a second cell 300 may be provided, which may be coupled over both sides of a membrane 100 with a particular gap between the first and second cells 200, 300, with anodes 210a formed on one side and cathodes 210b formed on the other side. As shown in the drawing, it is apparent that multiple cells can be implemented.

The first cell 200 can be composed of an anode 210a, the membrane 100, and a cathode 210b. The anode 210a and the cathode 210b can be made from catalyst layers that are stacked over the membrane 100, where the catalyst layer can be formed from a porous carbon conductive tape.

Figure 4B:
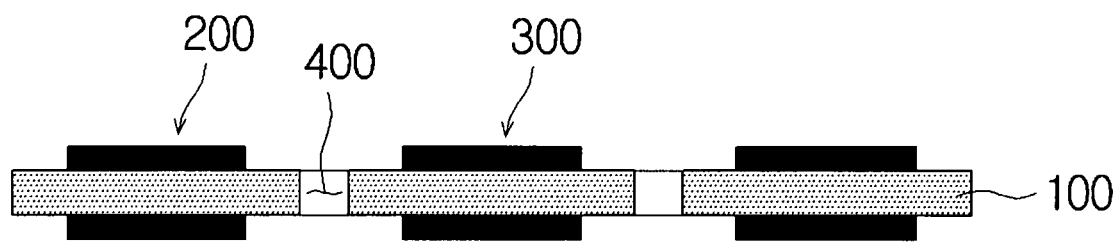
Figure 4C:
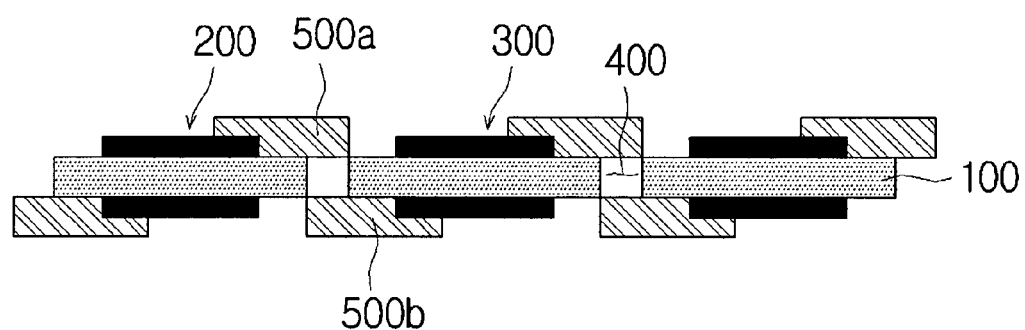

After perforating a hole 400 in the membrane 100 between the first cell 200 and second cell 300, as illustrated in FIG. 4B, the anode 210a of the first cell 200 and the cathode 210b of the second cell 300 can be electrically connected through the hole 400 using a conductive member, as illustrated in FIG. 4C.

The connecting method may proceed as illustrated in FIG. 4C, in which a first conductive tape 500a may be attached over one side of the membrane 10 to cover the hole 400, such that the first conductive tape 500a may be electrically connected with the anode 210a of the first cell 200 but electrically insulated from the anode 210a of the second cell 300.

Also, a second conductive tape 500b may be attached over the other side of the membrane 100 to cover the hole 400, such that the second conductive tape 500b may be electrically connected with the cathode 210b of the second cell 300 but electrically insulated from the cathode 210b of the first cell 200.

The first conductive tape 500a and second conductive tape 500b can include at least one of platinum, copper, and aluminum.

Figure 4D:
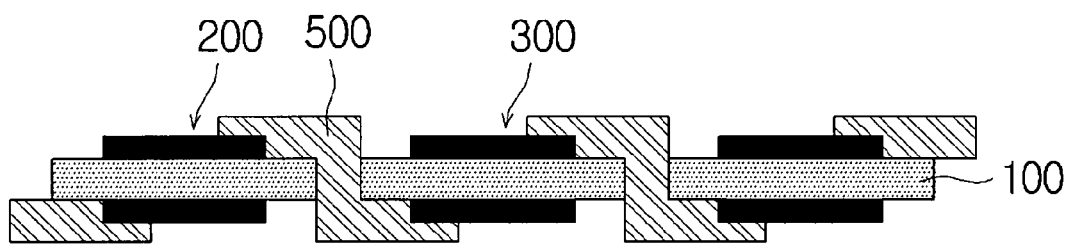

Finally, as illustrated in FIG. 4D, the first conductive tape 500a and the second conductive tape 500b may be compressed together to electrically connect the first conductive tape 500a and second conductive tape 500b. In this embodiment, the electrodes may be formed only from the catalyst layers, without the gas diffusion layers, to implement a thinner and more flexible MEA (membrane electrode assembly).

Figure 5:
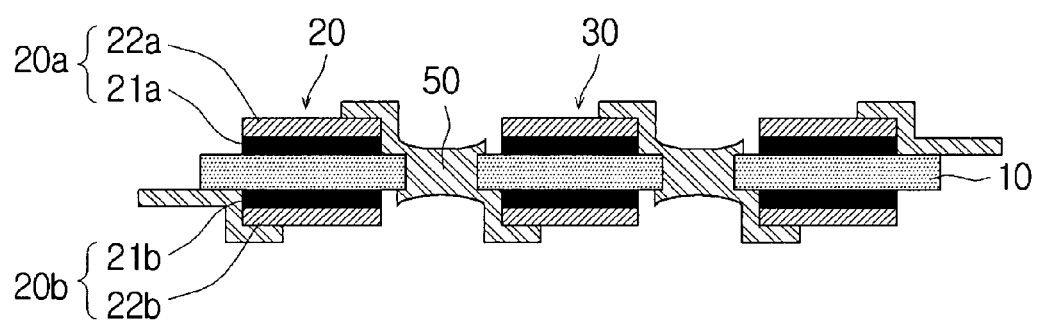
FIG. 5 is a cross-sectional view of a fuel cell according to an embodiment of the present invention.

FIG. 5 is a cross-sectional view of a fuel cell according to an embodiment of the present invention.

In FIG. 5, there are illustrated a membrane 10, a first cell 20, a second cell 30, anodes 20a, cathodes 20b, catalyst layers 21a, 21b, gas diffusion layers 22a, 22b, and compressed conductive tape 50.

Anodes 20a may be formed on one side, and cathodes 20b may be formed on the other side, of a membrane 10, where the anodes 20a and cathodes 20b can be made from catalyst layers 21a, 21b and gas diffusion layers 22a, 22b.

The anode 20a may be the fuel electrode, or the oxidation electrode, to which hydrogen or fuel may be supplied in order to initiate the oxidation reaction that generates hydrogen ions and electrons.

The cathode 20b may be the air electrode, or the reduction electrode, to which an oxidant may be supplied for a reduction reaction. Due to the movement of electrons generated at the anode 20a, electricity may be generated, together with the side products of heat and water.

The anode 20a and cathode 20b can each include a catalyst layer 21a, 21b stacked over the membrane 10, as well as a gas diffusion layer 22a, 22b formed in contact with the catalyst layer 21a, 21b. The membrane-electrode assembly may be structured to have anodes 20a and cathodes 20b coupled together with the membrane 10 in-between, and may include catalyst layers 21a, 21b, which transform fuel into electrons and hydrogen ions by way of the oxidation reaction, and gas diffusion layers 22a, 22b, which facilitate the movement of the electrons and hydrogen ions.

The fuel cell may include a first cell 20 and a second cell 30, with one cell defined by one anode 20a and one cathode 20b coupled onto both sides of a membrane 10. Of course, more than two cells may also be implemented.

The first cell 20 and the second cell 30 can be electrically connected using compressed conductive tape 50. The conductive tape 50 may include a first conductive tape, which may be electrically connected to the anode 20a of the first cell 20 and attached to one side of the membrane 10, and a second conductive tape, which may be electrically connected to the cathode 20b of the second cell 30, attached to the other side of the membrane 10, and electrically connected through a hole to the first conductive tape.

The first conductive tape and second conductive tape may be compressed together such that they are electrically connected, to implement a compressed conductive tape 50.

The conductive tape 50 may contain any one of platinum, copper, and aluminum.

While this particular embodiment provides an example of conductive tape being used for the electrical connections, it is apparent that other types of conductive member can be used, which may electrically connect the first cell 20 and second cell 30, may not require high temperatures, may not increase the volume of the fuel cell, and which may not require additional equipment.

By attaching and compressing the conductive tape 50 between the first cell 20 and second cell 30, it is possible to implement electrical connections for a flat type fuel cell. At the same time, unnecessary increases in volume can be avoided, and complicated flow paths for electrical connections between cells need not be implemented.

Furthermore, phenomena involving the leakage of fuel, which may occur when implementing a connection that traverses across the membrane 10, can be prevented. Also, by compressing the conductive tape 50 to fill in the hole, electrical resistance can be decreased.

The method of attaching the conductive tape 50 to the electrodes is simple to perform, and since high temperatures are not involved, unlike curing processes performed after plating or printing paste, the membrane 10 may not be subject to damage.

According to certain embodiments of the invention as set forth above, electrical connections can be implemented for a flat type fuel cell using conductive tape. Because of this arrangement, unnecessary increases in volume can be avoided, and there is no need for complicated flow paths in electrically connecting different cells.

Also, phenomena involving the leakage of fuel, which may occur when implementing a connection that traverses across the membrane, can be prevented, and by compressing the conductive tape to fill in the hole, electrical resistance can be reduced.

The method of attaching the conductive tape to the electrodes is simple to perform, and since high temperatures are not involved, unlike curing processes performed after plating or printing paste, the membrane may not be subject to damage.

While the invention has been described in detail with reference to particular embodiments, the embodiments are for illustrative purposes only and do not limit the invention. It is to be appreciated that those skilled in the art can change or modify the embodiments without departing from the scope and spirit of the invention. As such, many embodiments other than those set forth above can be found in the appended claims.

What is claimed is:

1. A method of manufacturing a fuel cell by electrically connecting a first cell and a second cell coupled over both sides of a membrane with a predetermined gap between the first cell and the second cell, the first cell and the second cell each having an anode on one side and a cathode on the other side, the method comprising:
    perforating a hole in the membrane between the first cell and the second cell; and
    electrically connecting the anode of the first cell with the cathode of the second cell through the hole by way of a conductive member, wherein
    the electrically connecting comprises:
    attaching a first conductive tape on one side of the membrane such that the first conductive tape is electrically insulated from the anode of the second cell, is electrically connected to the anode of the first cell, and covers the hole;
    attaching a second conductive tape on the other side of the membrane such that the second conductive tape is electrically connected to the cathode of the second cell and covers the hole; and
    electrically connecting the first conductive tape and the second conductive tape by compressing together the first conductive tape and the second conductive tape.

2. The method of claim 1, wherein the first cell comprises a catalyst layer stacked on the membrane and a as diffusion layer, and the anode and the cathode are comprised by the catalyst layer and the gas diffusion layer.

3. The method of claim 2, wherein the gas diffusion layer comprises at least one selected from a group consisting of carbon paper, carbon cloth, and carbon felt.

4. The method of claim 1, wherein the hole is formed by laser drilling.

5. The method of claim 1, wherein the first conductive tape contains at least one selected from a group consisting of platinum, copper, and aluminum.

* * * * *

UNITED STATES PATENT AND TRADEMARK OFFICE
CERTIFICATE OF CORRECTION

PATENT NO. : 8,197,983 B2  
APPLICATION NO. : 12/078736  
DATED : June 12, 2012  
INVENTOR(S) : Hye-Yeon Cha et al.

It is certified that error appears in the above-identified patent and that said Letters Patent is hereby corrected as shown below:

Column 8, Line 17, In Claim 2, delete "a as" and insert -- a gas --, therefor.

Signed and Sealed this
Twenty-eighth Day of August, 2012

David J. Kappos
*Director of the United States Patent and Trademark Office*